US007086587B2

(12) United States Patent
Myllymaki

(10) Patent No.: US 7,086,587 B2
(45) Date of Patent: Aug. 8, 2006

(54) ANTI-TRACKING SYSTEM TO ENSURE CONSUMER PRIVACY

(75) Inventor: Jussi Petri Myllymaki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/905,126

(22) Filed: Dec. 16, 2004

(65) Prior Publication Data

US 2006/0131375 A1    Jun. 22, 2006

(51) Int. Cl.
  *G06K 5/00*   (2006.01)
  *G06K 19/06*  (2006.01)
  *G06F 17/00*  (2006.01)
(52) U.S. Cl. .................. 235/380; 235/375; 235/492
(58) Field of Classification Search .............. 235/375, 235/385, 380, 492
  See application file for complete search history.

(56) References Cited

U.S. PATENT DOCUMENTS

| 6,121,544 | A |  | 9/2000 | Petsinger |
| 6,297,737 | B1 | * | 10/2001 | Irvin ...................... 340/571 |
| 6,523,752 | B1 | * | 2/2003 | Nishitani et al. ...... 235/462.44 |
| 2002/0116274 | A1 |  | 8/2002 | Hind et al. |
| 2002/0174025 | A1 |  | 11/2002 | Hind et al. |
| 2002/0185532 | A1 | * | 12/2002 | Berquist et al. ............. 235/385 |
| 2004/0054900 | A1 |  | 3/2004 | He |
| 2004/0100359 | A1 |  | 5/2004 | Reade et al. |
| 2004/0160323 | A1 |  | 8/2004 | Stilp |
| 2004/0169587 | A1 | * | 9/2004 | Washington .............. 340/573.1 |
| 2004/0186768 | A1 | * | 9/2004 | Wakim et al. ................ 705/14 |
| 2005/0099268 | A1 | * | 5/2005 | Juels et al. ................ 340/10.4 |

OTHER PUBLICATIONS

Michael Kanellos, CNET News.com—"Human Chips More Than Skin -Deep" Aug. 23, 2004, URL: http://zdnet.com.com/2100-1103-5319869.html.
Web articles at, www.rfidjournal.com/article/articleview/778/1/1 www.hitachi.co.jp/Prod/mu-chip www.newscientist.com/news/news.jsp?id=ns99994721.
Ari Juels, Ronald L. Rivest, Michael Szydlo, "The Blocker Tag: Selective Blocking of RFID Tags for Consumer Privacy" Oct. 27-31, 2003, Washington, DC, USA.

(Continued)

*Primary Examiner*—Thien M. Le
*Assistant Examiner*—April Taylor
(74) *Attorney, Agent, or Firm*—Marc D. McSwain

(57) ABSTRACT

A system, method and computer program product for enabling a user to detect nearby RFID tags and identify nearby RFID readers to enhance user privacy. A portable RFID reader scans for nearby tags, and a universal RFID tag detects nearby readers. The invention can alert the user of nearby RFID tags or readers, unless the user has disabled the alerting feature or unless a particular tag or reader is already known to the user and has been deemed allowable. A memory includes editable lists of allowable tags and readers. Exemplary alerts include outputs from a sound emitter, a vibrator, a light, or a display readout. The invention thus prevents surreptitious identification and tracking of a user and a user's possessions. The invention may be integrated into items typically carried by users so that the detection and alerting may be performed without outward indication.

4 Claims, 2 Drawing Sheets

OTHER PUBLICATIONS

Ari Juels and Ravikanth Pappu, RSA Laboratories, Bedford, MA 01730, USA, "Squealing Euros: Privacy Protection in RFID-Enabled Banknotes".

Dirk Henrici and Paul Muller, University of Kaiserslautern, Germany {henrici,pmueller} @ informatik.uni-kl.de.

* cited by examiner

ANTI-TRACKING SYSTEM TO ENSURE CONSUMER PRIVACY

FIELD OF THE INVENTION

This invention generally relates to the detection, counting, and location of radio frequency identification tags by consumers, and management of such tags to protect consumer privacy without loss of the advantages provided by the tags.

BACKGROUND OF THE INVENTION

Retailers and consumer product manufacturers are actively pursuing technologies based on radio frequency identification (RFID) that help them track the location of products in a supply chain, in warehouses, or on a shop floor. Conventional RFID tags are simple, small passive devices intended as an "electronic barcode" for use in supply chain management. Tags consist of small integrated circuit chips typically attached to small antennae, each capable of transmitting a unique serial number to a reading device in response to a query. Most RFID tags are batteryless, obtaining the power necessary for operation from an external modulated magnetic field, and can often be read at a distance of several meters.

The tags thus serve as means for remotely identifying a particular person or object to which they are attached. Manufacturers and shop owners prefer them to conventional optically-scanned barcodes because they uniquely identify individual items, rather than just product types, and because they can be read indirectly and in high volume. RFID tags are detected with handheld readers that in many cases are bulky and fairly expensive, on the order of $200–500 each. As technology advances, the size and price of readers declines, and eventually readers will be small enough to be incorporated into an item that is less conspicuous and more convenient to carry and operate. RFID tags are already quite common and offer many interesting possibilities that might be of value to consumers. For example, contactless smartcards are like ordinary credit or debit cards but incorporate an RFID tag, so that transactions can be made without requiring physical contact with a reader as with conventional magnetic stripes.

Unfortunately, this technology trend may lead to a serious loss of consumer privacy. A tracking device embedded in a product purchased by the consumer and not removed or deactivated at the store may be used for malicious purposes. In effect, the person carrying or wearing the product can be tracked wherever he or she goes—a privacy invasion of Orwellian proportions.

Several different approaches to the RFID privacy problem have been pursued in the past. U.S. Pat. No. 6,121,544 to Petsinger teaches a shielding device that effectively prevents communication with contactless smartcards or RFID tags. The shield is electrically conductive and has a high magnetic permeability so that the electromagnetic fluctuations that normally power the smartcard or tag are blocked. Similarly, any signal emitted by the tag or smartcard is also isolated from the outside world. To shield a tag, though, a user must know where the tag is located and then deliberately insert the tag into the shielding device. This has to be done for all tags a person is carrying in their clothing or on other objects.

A different strategy is proposed in U.S. Patent Application 2002/0100359 by Reade et al. and in the article by A. Juels, R. L. Rivest, and M. Szydlo: "The Blocker Tag: Selective Blocking of RFID Tags for Consumer Privacy" in the 8th ACM Conference on Computer and Communications Security, p. 103–111, ACM Press, 2003. These references teach a type of RFID tag that essentially mounts a denial of service attack on a RFID reader so the reader cannot capture the unique code that it would usually be able to capture from individual RFID tags. By flooding the reader with responses instead of transmitting one unique code, the blocker tag simulates the presence of a very large number of possible tags. While the reader cannot therefore uniquely identify the RFID tag, the blocking tag is basically a jamming (or spamming) device that makes its presence quite clearly known, so the reader is aware that someone wants to prevent their tags from being read. Reade et al. describe a variety of structures containing the jamming devices, each designed to resemble an item typically worn or carried by a consumer, including a cell phone, pager, camera, wristwatch, bracelet, belt, pen, and so forth.

A third approach is to employ cryptographic methods to allow tags to interact in a way that protects privacy better while providing the desired active functionality. U.S. Patent Application 2004/0054900 by He describes a complex system that employs public-private key encryption to exchange challenge/response message exchanges between RFID tags on manufactured merchandise and merchants' RFID interrogators. An article by D. Henrici and P. Muller, "Hash-Based Enhancement of Location Privacy for Radio-Frequency Identification Devices using Varying Identifiers" in the Proceedings of the Second IEEE Annual Conference on Pervasive Computing and Communications Workshops (PERCOMW'04), 2000, teaches a scheme for providing location privacy as well as data privacy. The general idea of the Henrici reference is to change the ID of a tag on every read attempt in a secure manner. Both these references require RFID tags that are more complex than those currently in use. Further, Henrici relies on read-write RFID tags and assumes that identical hash functions are used in all tags and readers; it does not solve the problem of RFID privacy when tags are read-only (as are the vast majority of today's tags) or when different types of tags are used. An item may contain multiple tags, e.g. from the manufacturer, transportation company, or retailer, and it is unlikely that they all have identical hash functions or that they are manufactured by the same RFID tag maker.

RFID chips are getting so small and so inexpensive that they can even be embedded in paper, e.g. printed tickets and ordinary paper currency. Hitachi manufactures an RFID chip 0.4 mm square that stores a unique ID number capable of individually identifying trillions of trillions of objects with no duplication. Financial privacy concerns are among the most seriously held consumer opinions, and often determine whether and how fast a potentially invasive technology is adopted.

An article by A. Juels and R. Pappu, "Squealing Euros: Privacy Protection in RFID-Enabled Banknotes", in the 7th International Conference on Financial Cryptography, 2003, p. 103–121, emphasizes this concern. Juels et al. describe a cryptographic system for hiding the identity of high-denomination Euro banknotes that include embedded RFID tags. In this proposed scheme, the banknote's serial number is transmitted in encrypted form but is re-encrypted on request. Since the encrypted value changes and the encryptions cannot be readily inverted, there is no way to determine if two encrypted values were transmitted by the same banknote. However, this scheme requires cooperation from tag manufacturers (so that all tags have the required computational capabilities), as well as reader manufacturers and the law enforcement agencies who manage the private keys used in encryption.

These prior art efforts to solve RFID privacy problems are poorly adapted to the basic objective: simply giving the consumer the freedom to decide whether and how to participate in the RFID universe without interfering with, overly complicating, or constraining the design of future RFID systems. The consumer faces the prospect of having tracking devices embedded in everyday items yet not knowing if a given item in fact has an active tracking device. This situation calls for a counter-measure that empowers users to make informed judgments about their privacy.

SUMMARY OF THE INVENTION

It is accordingly an object of this invention to detect RFID tags near individual users and selectively alert the users whether they are carrying any detected RFID tags so that the users can take any desired defensive action. The invention includes a portable RFID reader that scans nearby tags and helps the user determine whether a nearby item or person is safe, from a privacy point of view. The invention can also determine how many tags are near a user, and where the tags are located (typically on items a user is carrying).

Defensive actions may include selectively removing or deactivating tags, shielding the tags, returning tagged items to their source, or simply leaving specific tags alone if they serve some desired purpose. Similarly, the invention allows a user to benefit from detection and warning of any potentially malicious RFID reader that is active nearby.

RFID tags and/or readers that are known to the user may be deemed allowable, so that their presence need not trigger any alert or warning. A memory storing lists of such tags or readers can be updated or amended by the user. Alternately, the user may choose to disable alerts and warnings, which could include sounds, vibrations, lights, and readouts on a display. The invention may be integrated into devices that are typically carried by users, including but not limited to cell phones, PDAs, watches, and even belt buckles.

DETAILED DESCRIPTION OF THE INVENTION

Figure 1:
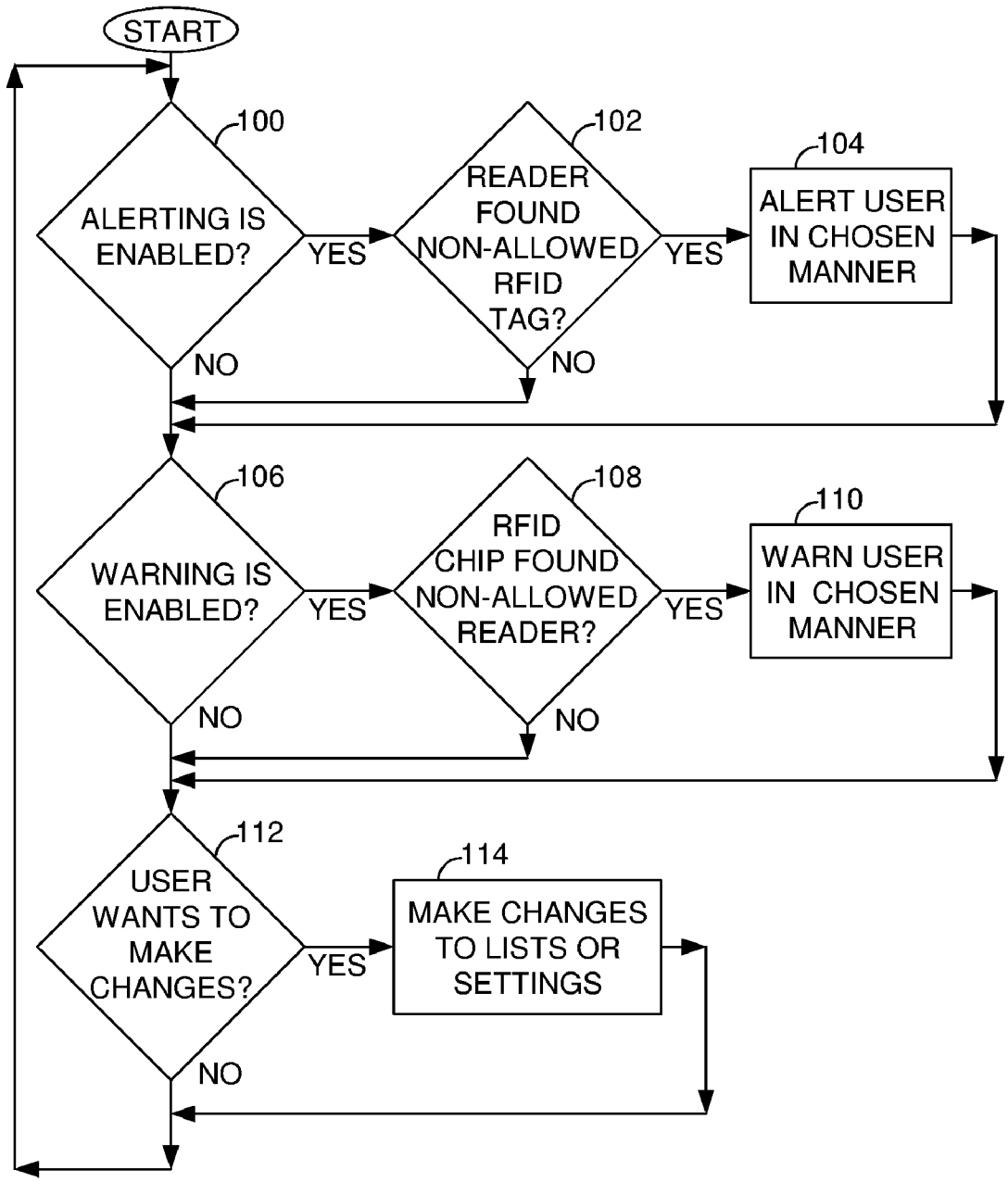
FIG. 1 is a flowchart of an RFID privacy management method, according to an embodiment of the invention.
Figure 2:
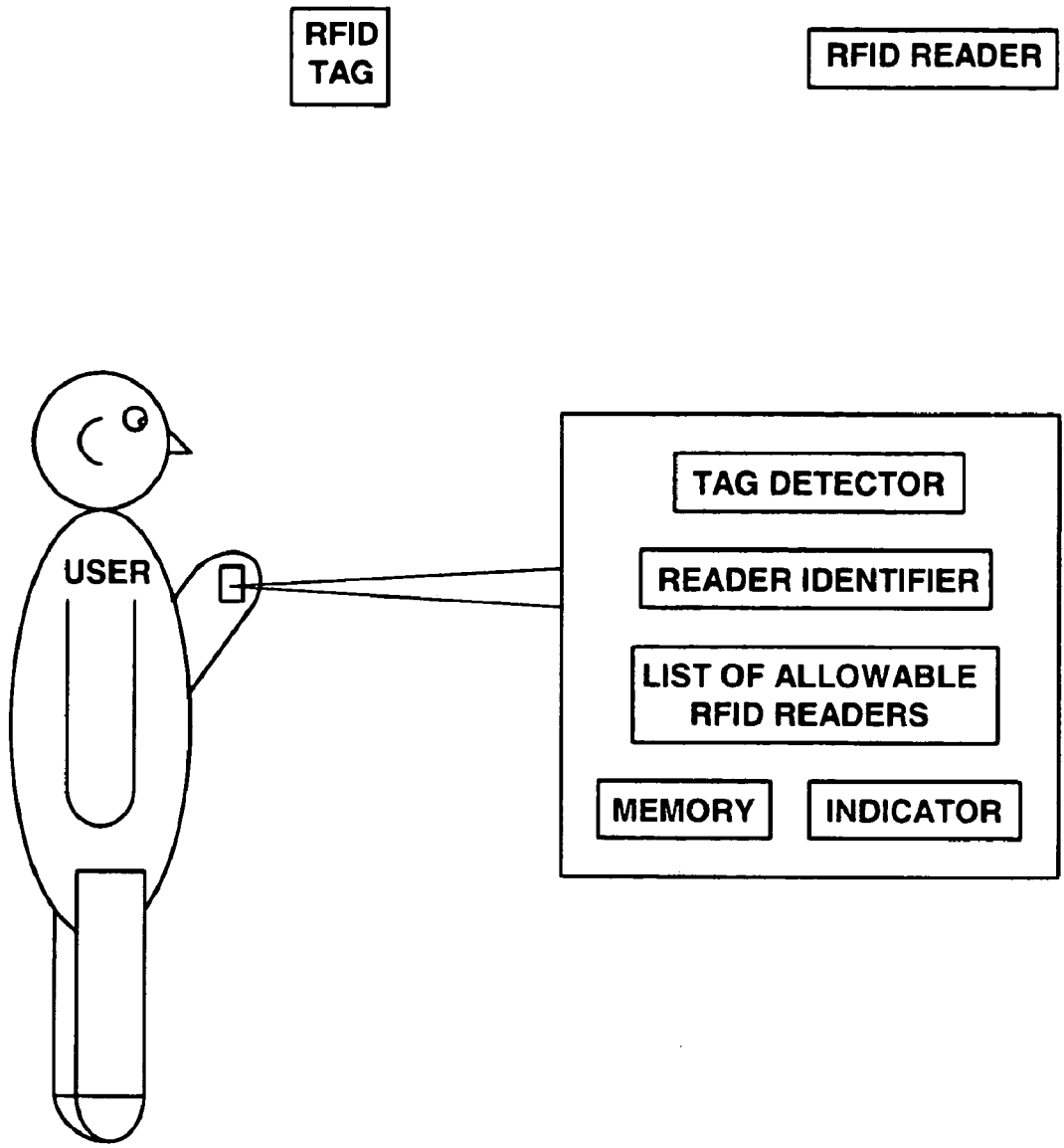
FIG. 2 is a diagram of an RFID privacy management system, according to an embodiment of the invention.

In an exemplary embodiment, the present invention is a system, method, and computer program product for protecting a user's privacy by scanning the user's immediate environment and alerting the user when an active tracking device is found in the user's proximity. For instance, an RFID tag may be in the clothing the user is wearing, a bag the user is carrying, or the money the user has in a wallet.

The invention includes a portable battery-powered RFID reader that activates any nearby RFID tags and thus helps the user determine whether a nearby item or person is subject to tracking (i.e. privacy violation). A low-power miniature reader can be integrated into a key chain, a credit card, belt buckle or other device that a consumer might typically carry. The power required to read an RFID tag is strongly dependent on the distance separating the tag and the reader, so smaller, lower power readers will have more limited ranges. However, a loop antenna can be embedded in a user's belt that should enable a range of approximately one meter. The invention can also determine where a detected RFID tag is located, based for example on the amount of power needed to read the tag and/or on the strength of the tag signal as received by the reader. Each tag within the reader's range will emit a response, so the reader can simply count the number of tags within range (except for blocker tags, which essentially impersonate a vast number of tags). The portable reader operates either continuously or only when turned on by the user, to save power.

The invention also includes an indicator device that can alert the user to the presence of a detected tag. The indicator device can include, for example, a sound source, a light source, a vibrator, or a liquid crystal display readout. The user thus may be unobtrusively made aware of nearby tracking devices that could be used to identify the user or his possessions and track their position. When a tag is detected, the user may take defensive actions to prevent infringement upon user privacy, including selectively removing or deactivating tags, shielding the tags, returning tagged items to their source, or simply leaving specific tags alone if they serve some desired purpose.

The reader-based anti-tracking system also includes an embedded "universal RFID chip" that responds to any query from any external readers nearby (i.e. readers other than the portable anti-tracking reader itself). Thus, potentially malicious nearby readers can be detected. However, instead of emitting information to those external readers, the chip triggers a warning in the invention, notifying the user that an external reader was detected nearby. The reader detection feature can be toggled on and off, as can the generation of the warning that a reader has been detected, as well as the tag detection and alert features. A user visiting a place where readers are common (such as shopping malls) may turn off the reader detection component and turn it back on after the visit, for example. The entire invention is preferably integrated into devices that are typically carried by users, including but not limited to cell phones, laptop computers, PDAs, watches, and even belt buckles.

A reader-based anti-tracking system differs from RFID jamming/spamming chips in that the reader is actively and positively detecting RFID chips, while an RFID spamming chip merely prevents other chips from being read but does not help to detect and remove them. If we draw an analogy to wiretapping and eavesdropping, a reader-based system is like an anti-bugging device while an RFID spamming chip is like high-volume noise coming out of a loudspeaker, which simply drowns out other audible signals.

Certain particular RFID tags that are known to the user may be deemed allowable, so that their presence need not trigger any alert. This feature permits the user to carry certain tagged items such as security passes, company badges, toll payment devices, RFID-enabled credit cards, or similar personal items without triggering the alert. A memory storing lists of such tags can be updated or otherwise amended by the user.

Similarly, certain external readers that are known to the user may also be deemed allowable, so that their presence need not trigger any warning. The user can add "allowed RFID readers" (such as those found at security gates or toll booths) to a list maintained by the anti-tracking system in order to avoid receiving warnings on those readers. The list of "allowed" RFID readers is also editable by the user, for example by using a few control buttons and a display readout.

A reader-based anti-tracking system has at least two specific advantages over blocker tags. First, a reader can be selective in alerting or not alerting the user to the presence of RFID tracking devices. This is important when the user wants to carry an allowed RFID chip (for instance, a company ID badge). Thus the system can be configured not to trigger an alert on an allowed RFID tag. Also, a reader-based system alerts only the user, but not potential malicious readers, of its activity. In contrast, a blocker tag advertises its presence to all readers.

Referring now to FIG. 1, a flowchart of the privacy management method is shown. In step 100, if the user has chosen to be alerted of RFID tag detection, the portable reader is activated and scans for nearby RFID tags and gathers information as to their number, probable distance, and ID number (or, in the case of blocker tags, an indication that a vast number of tags appear to be responding). In step 102, the invention determines whether each detected tag is deemed allowable and in step 104 responsively alerts the user to the presence of non-allowable tags in the manner chosen. In step 106, if the user has chosen to be warned of RFID reader detection, the universal RFID chip is activated and in step 108 determines if each identified external RFID reader is deemed allowable, and in step 110 responsively warns the user of non-allowable readers in the manner chosen. This process repeats as long as the invention is turned on. In step 112, the invention checks to see if the user wants to make changes, then in step 114 allows the user to edit lists of allowed tags and allowed readers during the invention's iterations, as well as alter other invention settings.

A general purpose computer is programmed according to the inventive steps herein. The invention can also be embodied as an article of manufacture—a machine component—that is used by a digital processing apparatus to execute the present logic. This invention is realized in a critical machine component that causes a digital processing apparatus to perform the inventive method steps herein. The invention may be embodied by a computer program that is executed by a processor within a computer as a series of computer-executable instructions. These instructions may reside, for example, in RAM of a computer or on a hard drive or optical drive of the computer, or the instructions may be stored on a DASD array, magnetic tape, electronic read-only memory, or other appropriate data storage device.

While the particular ANTI-TRACKING SYSTEM TO ENSURE CONSUMER PRIVACY as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

What is claimed is:

1. A method of enhancing privacy, comprising:
   detecting RFID tags near a user and selectively alerting the user upon tag detection; and
   identifying RFID readers near the user and selectively warning the user upon reader detection, wherein the user is a consumer who modifies a list of allowable RFID readers.

2. A system for enhancing privacy, comprising:
   means for detecting RFID tags near a user and selectively alerting the user upon tag detection; and
   means for identifying RFID readers near the user and selectively warning the user upon reader detection, wherein the user is a consumer and wherein the detecting and identifying are performed surreptitiously.

3. A system for enhancing privacy, comprising:
   a portable RFID reader that detects RFID tags near a user;
   a universal RFID tag that identifies RFID readers near the user;
   a user-controllable indicator unit that selectively alerts the user upon tag detection and selectively warns the user upon reader detection; and
   a memory for storing editable lists, wherein the user is a consumer who modifies a list of allowable RFID readers.

4. A computer program product comprising a computer usable medium tangibly embodying computer readable program code means for enhancing privacy, the program code means comprising:
   code means for detecting RFID tags near a user and selectively alerting the user upon tag detection; and
   code means for identifying RFID readers near a user and selectively warning the user upon reader detection, wherein the user is a consumer who modifies a list of allowable RFID readers.

* * * * *